UNITED STATES PATENT OFFICE 2,475,689

PROCESS FOR QUATERNIZING PYRIDINE COMPOUNDS

Franz Bergel, Aaron Cohen, John Wynne Haworth, Edward Graham Hughes, and John Arthur Silk, Welwyn Garden City, England, assignors to Hoffmann-La Roche Inc., Nutley, N. J., a corporation of New Jersey No Drawing. Application May 2, 1946, Serial No. 666,847. In Great Britain April 30, 1945

5 Claims. (Cl. 260—295)

This invention relates to the manufacture of N-substituted ketotetrahydropyridine derivatives and to the manufacture therefrom of 3-hydroxy-N-substituted pyridium salts and of 3-hydroxy pyridine derivatives related to vitamin B6 and intermediates therefor.

According to this invention, the first step in the process can be represented by the reaction,

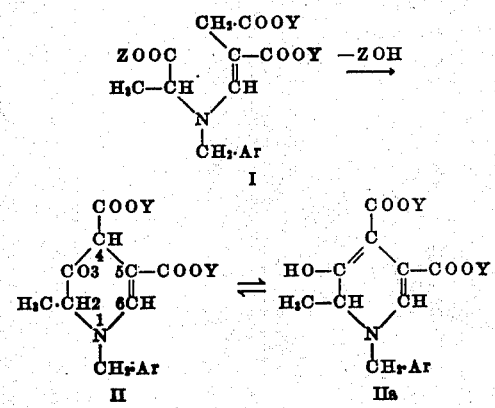

where Ar is a phenyl or substituted phenyl group wherein the substituent can be described as one which is not affected by the reagents employed or capable of internally reacting with the rest of the molecule in the series of reactions hereinafter described, and Y and Z are lower alkyl groups, in which the compounds of the general formula I are cyclized by submitting them to the action of an alkali metal amide and treating the alkali metal derivative of the compound so formed with acid to yield compounds of the general formula II wherein the numbers enclosed in the ring system refer to the relative positions of the carbon atoms constituting said system.

The compound of the general formula II may be described as a 3-hydroxydihydropyridine derivative as well as a ketotetrahydropyridine derivative since enolisation may take place at the keto group in position 3. Such an enolic form is seen in the general formula IIa.

In the reaction in which the alkali metal amide is used best results are obtained by conducting the reaction in an inert solvent which is preferably benzene although other inert solvents may be used and are included within the scope of this invention.

On treating the compounds of the general formula II with a halogenating agent such as sulphuryl chloride or chlorine or bromine, in accordance with the process of this invention, and if necessary, warming the product, preferably under partial vacuum, there is formed a pyridinium compound of the general formula,

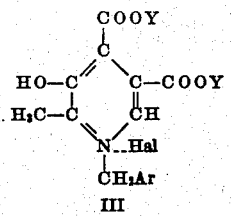

where Hal stands for halogen and Ar and Y have the values previously assigned to them.

The compound of the general formula III is then treated, also in accordance with the invention, with hydrogen in the presence of a hydrogenation catalyst whereupon it yields the hydrohalide of a 3-hydroxypyridine of the general formula,

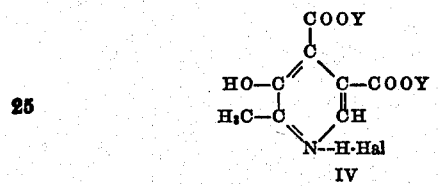

which can then be converted to the free base in a known manner.

In the manufacture of 2-methyl-3-hydroxy-4,5-dicarbmethoxypyridine for instance, the condensation product of methyl α-benzylaminopropionate and dimethyl α-formylsuccinate of the formula I in which Y and Z are methyl groups and Ar is phenyl, is treated with sodamide and the resulting sodium derivative treated with acid to yield N-benzyl-2-methyl-3-hydroxy-4,5-dicarbmethoxy-dihydropyridine (cf. compound II, enolic form, in which Y=methyl and Ar= phenyl). This latter compound is then treated with reagents such as sulphuryl chloride, chlorine or bromine to form N-benzyl-2-methyl-3-hydroxy-4,5-dicarbmethoxy-pyridinium chloride (cf. compound III) which can be hydrogenated to the 2-methyl-3-hydroxy-4,5-dicarbmethoxy-pyridine.

The starting compounds of formula I and their method of preparation are described in U. S. Patent 2,384,068.

In order that the invention may be more clearly understood and readily carried into effect a number of specific examples will now be given. These examples, given by way of illustration and not intended to limit the scope of the invention, are:

Example 1

3.2 parts by weight of powdered sodamide are added to a solution of 28.5 parts by weight of the compound I in which Ar=phenyl and Y and Z=methyl in 120 parts by weight of dry benzene, and the mixture is stirred while heated on a water bath in an atmosphere of dry nitrogen. A vigorous reaction occurs with the dissolution of the sodamine and the evolution of ammonia, after which the solution is boiled under reflux for 1 hour and cooled. It is shaken with ice and acetic acid containing a little sulphuric acid, the amount of acid used being equivalent to the sodamide and the benzene extract of the product (cf. compound II or IIa) so obtained is washed with water, sodium bicarbonate solution, water again, dried and freed from solvent. The residual oil, which is essentially N-benzyl-2-methyl-3-hydroxy-4,5-dicarbmethoxy-dihydropyridine (cf. compound II in its enolic form), is taken up in 170 parts by weight of dry benzene. To this solution is added dropwise with stirring 30 parts by weight of sulphuryl chloride, the temperature of the reaction mixture being maintained at 35–40° C. A vigorous reaction takes place, hydrogen chloride is evolved and an oil separates out from the benzene solution. When separation of the oil is complete the benzene is decanted and the oil warmed for some hours at about 40° C. in a partial vacuum. The residue is digested with 30 parts by weight of acetone when the required N-benzyl-2-methyl-3-hydroxy-4,5-dicarbmethoxy-pyridinium chloride (cf. compound III) separates as a crystalline solid which melts at 148° C. with decomposition.

This product is filtered from the acetone, washed with the same solvent, and a further quantity of this compound is obtained by treatment of the acetone filtrate with dry ether. The total yield of the product is 60 to 70% of the theoretical.

A solution of 6.5 parts by weight of 1-benzyl-2-methyl-3-hydroxy-4,5-dicarbmethoxy-pyridinium chloride in 20 parts by volume of methyl alcohol is shaken with hydrogen in the presence of 0.5 part by weight of palladized charcoal (in the ratio of 1 part by weight of palladium to 4 parts by weight of charcoal). When the calculated amount of hydrogen is taken up the catalyst is filtered off and the methyl alcohol evaporated off under reduced pressure, the product, which is 2-methyl-3-hydroxy-4,5-discarbmethoxy-pyridine hydrochloride (cf. compound IV), is crystallized from alcohol-ether in colorless needles having a melting point of 165° C. with decomposition.

Example 2

The process described in Example 1 was carried out with twice the quantity of sodamide. The working conditions were otherwise the same, but, of course, the amount of acid required to liberate the cyclisation product was doubled.

Example 3

If in the above Example 1 a solution of 5.9 parts by weight of chlorine in 85 parts by weight of carbon tetrachloride is used instead of sulphuryl chloride, and the same process of working up and purification is followed, the same intermediate product is obtained, that is, a compound of the general formula III in which Y is methyl, Ar is phenyl and Hal is chlorine.

Example 4

To a dry benzene solution containing 30 parts by weight of N-benzyl-2-methyl-3-hydroxy-4,5-dicarbmethoxy-dihydropyridine there is added, with ice cooling and stirring, the greater part of a solution of 16 parts by weight of bromine in 100 parts by weight of carbon tetrachloride. A viscous oil separates from the solution and, when no further separation of the oil is observed, the addition of the bromine is stopped. The supernatant liquid is decanted and the residue, which evolves hydrogen bromide gas, is subjected to a partial vacuum for several hours, after which a porous semi-solid material remains. This is digested with 25 parts by weight of acetone and the resulting solution treated with 40 parts by weight of dry ether. After cooling for some time, the crystalline product which has separated is filtered off and washed with an acetone/dry ether mixture, yielding about 18 parts by weight of N-benzyl-2-methyl-3-hydroxy-4,5-dicarbmethoxy-pyridinium bromide which, after recrystallisation from methanol and ether has a melting point of 134° C. with decomposition. The bromide radical may be exchanged for chloride by treating with silver chloride in methanol.

We claim:

1. Process which comprises treating a compound graphically represented by the formula

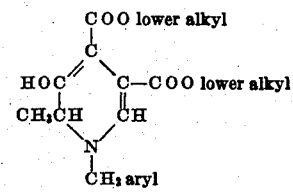

with a quaternizing halogenating agent to produce a compound graphically represented by the formula

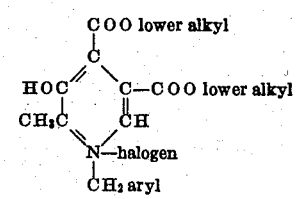

2. Process according to claim 1 in which "lower alkyl" is methyl and "aryl" is phenyl.

3. Process according to claim 1 in which the halogenating agent is sulphuryl chloride.

4. Process according to claim 1 in which the halogenating agent is chlorine.

5. Process according to claim 1 in which the halogenating agent is bromine.

FRANZ BERGEL.
AARON COHEN.
JOHN WYNNE HAWORTH.
EDWARD GRAHAM HUGHES.
JOHN ARTHUR SILK.

REFERENCES CITED

The following references are of record in the file of this patent:

FOREIGN PATENTS

| Number | Country | Date |
|---|---|---|
| 556,044 | Great Britain | Sept. 17, 1943 |